United States Patent
Gao et al.

(10) Patent No.: US 10,194,139 B2
(45) Date of Patent: Jan. 29, 2019

(54) DISPARITY-TO-DEPTH CALIBRATION FOR PLENOPTIC IMAGING SYSTEMS

(71) Applicants: Liang Gao, Santa Clara, CA (US);
Ivana Tosic, San Francisco, CA (US);
Noah Bedard, Pacifica, CA (US)

(72) Inventors: Liang Gao, Santa Clara, CA (US);
Ivana Tosic, San Francisco, CA (US);
Noah Bedard, Pacifica, CA (US)

(73) Assignee: RICOH COMPANY, LTD., Tokyo (JP)

( * ) Notice: Subject to any disclaimer, the term of this patent is extended or adjusted under 35 U.S.C. 154(b) by 177 days.

(21) Appl. No.: 15/050,422

(22) Filed: Feb. 22, 2016

(65) Prior Publication Data

US 2017/0244957 A1    Aug. 24, 2017

(51) Int. Cl.
| | |
|---|---|
| *H04N 13/02* | (2006.01) |
| *H04N 13/00* | (2018.01) |
| *G06T 17/00* | (2006.01) |
| *H04N 13/282* | (2018.01) |
| *G06T 7/80* | (2017.01) |

(Continued)

(52) U.S. Cl.
CPC .......... *H04N 13/282* (2018.05); *G06T 7/002* (2013.01); *G06T 7/557* (2017.01); *G06T 7/80* (2017.01); *H04N 13/128* (2018.05); *G06T 2207/10012* (2013.01); *G06T 2207/10052* (2013.01);

(Continued)

(58) Field of Classification Search
CPC .......... G06T 7/557; G06T 2207/10012; G06T 2207/20228; G06T 7/80; H04N 13/0203; H04N 2013/0081; H04N 5/225; H04N 5/2258; H04N 13/128; H04N 13/246; H04N 13/282; G02B 27/0075
See application file for complete search history.

(56) References Cited

U.S. PATENT DOCUMENTS 8,619,082 B1* 12/2013 Ciurea .................... G06T 7/593
345/427
8,803,918 B2   8/2014 Georgiev et al.
(Continued)

FOREIGN PATENT DOCUMENTS

EP        3162281 A1    5/2017

OTHER PUBLICATIONS

Diebold, M. et al., "Light-Field Camera Design for High-Accuracy Depth Estimation," Optomechatronic Micro-Nano Devices and Components III, Proceedings of SPIE, May 18, 2015, pp. 952803-952803, vol. 9528.

(Continued)

*Primary Examiner* — Nathanael Aynalem
(74) *Attorney, Agent, or Firm* — Fenwick & West LLP (57) ABSTRACT

A procedure to calibrate a depth-disparity mapping for a plenoptic imaging system. In one aspect, one or more test objects located at known field positions and known depths are presented to the plenoptic imaging system. The plenoptic imaging system captures plenoptic images of the test objects. The plenoptic images include multiple images of the test objects captured from different viewpoints. Disparities for the test objects are calculated based on the multiple images taken from the different viewpoints. Since the field positions and depths of the test objects are known, a mapping between depth and disparity as a function of field position can be determined.

20 Claims, 9 Drawing Sheets

(51) Int. Cl.
G06T 7/557 (2017.01)
H04N 13/128 (2018.01)
G06T 7/00 (2017.01)

(52) U.S. Cl.
CPC .............. G06T 2207/20228 (2013.01); H04N 2013/0081 (2013.01)

(56) References Cited

U.S. PATENT DOCUMENTS

| | | | | |
|---|---|---|---|---|
| 2008/0143690 | A1* | 6/2008 | Jang | G06F 3/0428 345/175 |
| 2014/0241431 | A1* | 8/2014 | Zhang | H04N 19/56 375/240.16 |
| 2015/0373316 | A1 | 12/2015 | Meng et al. | |

OTHER PUBLICATIONS

European Extended Search Report, European Application No. 17154455.4, dated Jun. 29, 2017, 12 pages.

Gao, L. et al., "Disparity-to-Depth Calibration in Light Field Imaging," 2016 Imaging and Applied Optics Congress, Jul. 25, 2016, 3 pages, [Online] [Retrieved on Jun. 13, 2017] Retrieved from the Internet<URL:https://www.osapublishing.org/DirectPDFAccess/60B2AC1E-9950-548B-C6CCC5AE009FED5E_346891/COSI-2016-CWD.2.pdf?da=1&id=346891&uri=COSI-2016-CW3D.2&seq=0&mobile=no>.

Johannsen, O. et al., "On the Calibration of Focused Plenoptic Cameras," Time-of-Flight and Depth Imaging, Parallel Computing, Lecture Notes in Computer Science (LNCS), M. Grzegorzek et al. (eds.), Oct. 2012, pp. 302-317, vol. 8200.

Riou, C. et al., "Calibration and Disparity Maps for a Depth Camera Based on a Four-Lens Device," Journal of Electronic Imaging, SPIE/IS & T, Nov./Dec. 2015, pp. 061108-1-061108-11, vol. 24, No. 6.

Dansereau, D.G. et al., "Decoding, Calibration and Rectification for Lenselet-Based Plenoptic Cameras," 2013 IEEE Conference on Computer Vision and Pattern Recognition (CVPR), IEEE, 2013, pp. 1027-1034.

Tosic, I. et al., "Light Field Scale-Depth Space Transform for Dense Depth Estimation," 2014 IEEE Conference on Computer Vision and Pattern Recognition Workshops (CVPRW), IEEE, 2014, pp. 441-448.

Heinze, C. et al. "Automated Robust Metric Calibration of Multi-Focus Plenoptic Cameras," 2015 IEEE International Instrumentation and Measurement Technology Conference (I2MTC), IEEE, 2015, pp. 2038-2043.

* cited by examiner

DISPARITY-TO-DEPTH CALIBRATION FOR PLENOPTIC IMAGING SYSTEMS

BACKGROUND

1. Field of the Invention

This disclosure relates generally to calibration of plenoptic imaging systems.

2. Description of Related Art

The plenoptic imaging system has recently received increased attention. It can be used to recalculate a different focus point or point of view of an object, based on digital processing of the captured plenoptic image. The plenoptic imaging system also finds application in estimating depth to three-dimensional objects that are imaged by the plenoptic imaging system, possibly followed by three-dimensional reconstruction of those objects or the entire three-dimensional scene. Another application is multi-modal imaging, using a multi-modal filter array in the pupil plane of the primary imaging module. Each filter is imaged at the sensor, effectively producing a multiplexed image of the object for each imaging modality of the filter array. Other applications for plenoptic imaging systems include varying depth of field imaging and high dynamic range imaging.

However, the architecture of a plenoptic imaging system is different from that of a conventional imaging system, and therefore requires different calibration and processing procedures. Many plenoptic imaging systems use an array of microlenses. The image captured by the plenoptic imaging system can be processed to create multiple images of the object taken from different viewpoints. These multi-view images carry a level of parallax between them, which corresponds to the three-dimensional structure of the imaged object. This parallax is usually quantified by disparity, which can be defined as an amount of shift that a pixel corresponding to a point in space undergoes from one view to another. The disparity depends on the depth location of the object. In order to convert disparity to an actual depth, a mapping between depth and disparity is required. These mappings typically have been created using a thin lens model for the primary lens in the plenoptic imaging system and a pinhole model for the microlens array. However, for many real plenoptic imaging systems, these assumptions are not particularly good. This is especially true for systems with large optical aberrations, such as field curvature. In such cases, the mapping can vary significantly from the simple thin lens—pinhole model and is highly dependent on the optical characteristics of the system.

Thus, there is a need for better approaches to determine the mapping between depth and disparity for plenoptic imaging systems.

SUMMARY

The present disclosure overcomes the limitations of the prior art by providing a procedure to calibrate a depth-disparity mapping for a plenoptic imaging system.

In one aspect, a method for calibrating a depth-disparity mapping for a plenoptic imaging system includes the following. One or more test objects located at known field positions and known depths are presented to the plenoptic imaging system. The plenoptic imaging system captures plenoptic images of the test objects. The plenoptic images include multiple images of the test objects captured from different viewpoints. Disparities for the test objects are calculated based on the multiple images taken from the different viewpoints. Since the field positions and depths of the test objects are known, a mapping between depth and disparity as a function of field position can be determined.

Different types of test objects can be used, such as point sources that are scanned to different depths and field positions and planar objects that are scanned to different depths. The depth-disparity mapping can be represented by different forms, including lookup table and polynomial or linear fit.

Once calibrated, the plenoptic imaging system can be used to estimate the depths of real objects. The depth estimates can then be used for three-dimensional reconstructions of those objects, for example by using methods for three-dimensional reconstruction from point clouds. A plenoptic image of the real object is captured and processed to obtain disparities for the real object. The disparities are converted to depth using the mapping obtained from calibration.

Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
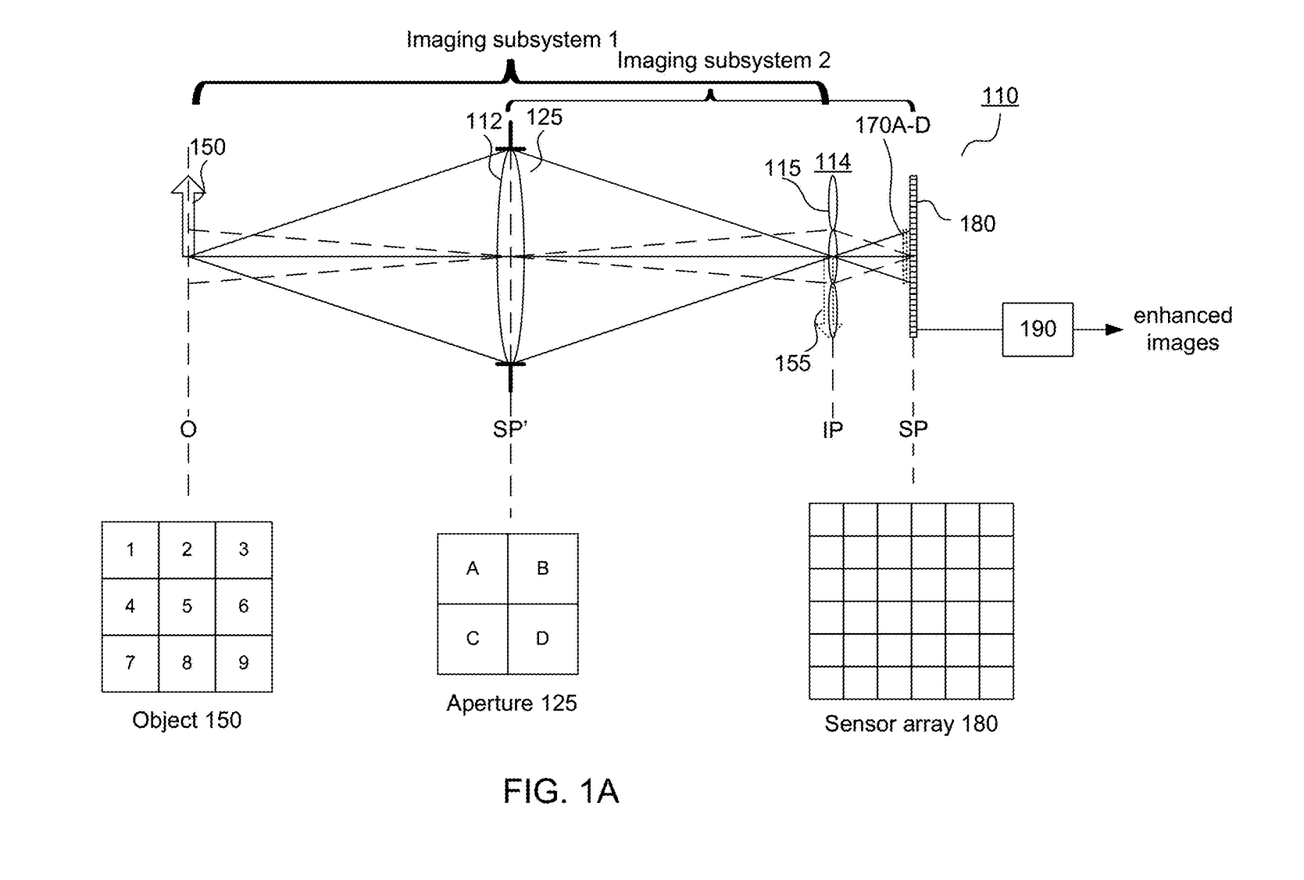
FIGS. 1A-1B depict diagrams illustrating a plenoptic imaging system, according to an embodiment.
Figure 1B:
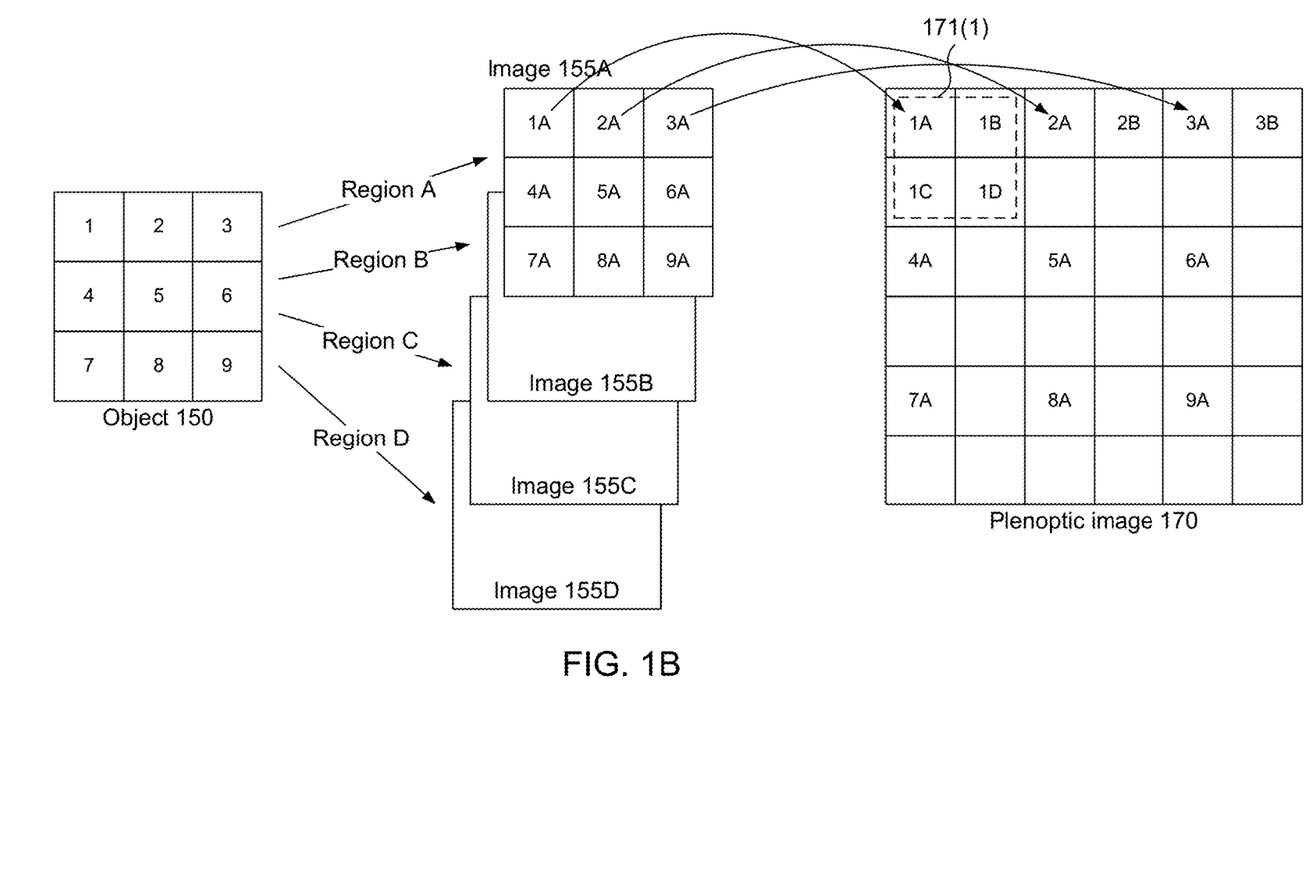

FIGS. 1A-1B depict diagrams illustrating an example of a plenoptic imaging system 110. The plenoptic imaging system 110 includes primary imaging optics 112 (represented by a single lens in FIG. 1A), a secondary imaging array 114 (e.g., an array of microlenses 115) and a sensor array 180. The secondary imaging array 114 may be referred to as a microimaging array. The secondary imaging array 114 and sensor array 180 together may be referred to as a plenoptic sensor module. These components form two overlapping imaging subsystems, shown as subsystem 1 and subsystem 2 in FIG. 1A.

For convenience, the imaging optics 112 is depicted in FIG. 1A as a single objective lens, but it should be understood that it could contain multiple elements. In FIG. 1A, the objective lens 112 forms an optical image 155 of the object 150 at an image plane IP. When operated at the "in focus" condition, the microimaging array 114 is located at the image plane IP. The system in its entirety forms spatially multiplexed and interleaved optical images 170 at the sensor plane SP. Examples of microimaging arrays 114 include microlens arrays, arrays of pinholes, micromirror arrays, checkerboard grids and waveguide/channel arrays. The microimaging array 114 can be a rectangular array, hexagonal array or other types of arrays. The sensor array 180 is also shown in FIG. 1A.

For purposes of illustration, assume that the microimaging array 114 in FIG. 1A is a 3×3 array of microlenses on a square grid. The object 150 is divided into a 3×3 array of regions, which are labeled 1-9 as shown in the lower portion of FIG. 1A. These regions correspond to the microlenses. That is, object region 1 is imaged by objective lens 112 onto one of the microlenses, object region 2 is imaged onto another microlens, etc. The sensor array 180 is shown as a 6×6 rectangular array of sensors. That is, there is a 2×2 arrangement of sensors under each microlens. The aperture 125 is divided into a 2×2 rectangular array of regions A-D. These regions correspond to the 2×2 sensor arrangements. That is, aperture region A is imaged by each microlens onto the corresponding sensor of the 2×2 sensors for that microlens, as are aperture regions B,C,D. In some systems, the aperture regions A-D may be filtered by a different spectral filter, for example.

Note that rays from object 150 can be defined using four dimensions (x,y,u,v), where (x,y) is a measure of the spatial coordinate from which the ray originates and (u,v) is a measure of the location of the viewpoint to which the ray connects. The division of object 150 into 3×3 regions is a partition of the (x,y) space. The division of the aperture 125 into 2×2 regions is a partition of the (u,v) space. For reasons that will be apparent, (x,y) will sometimes be referred to as the field position and (u,v) as the viewpoint. Thus rays that originate from region 1 of the object provide information about field position 1 of the object 150. Rays that propagate through region A of the aperture 125 provide information of the object 150 from viewpoint A. The data produced by the detector array 180 is then a sampling of the four-dimensional light field I(x,y,u,v) produced by the object.

A processing module 190 collects the data from the detector array 180 and processes it accordingly. As a simple example, the processing module 190 may reorder the data, collecting together the data in order to form an image of the entire object 150 for light passing through the aperture 125. Other types of processing can also be performed, since the captured light field data includes information with respect to both the pupil plane and the object 150. For example, the captured data includes multiple images of the object captured from different viewpoints. The parallax in this data can be used to estimate depth to the object.

FIG. 1B illustrates conceptually how the spatially multiplexed optical images 170A-D are produced and interleaved at sensor array 180. The object 150 produces rays. The rays that propagate through aperture region A (i.e., viewpoint A) would produce an optical image 155A at the IP. To identify the optical image 155A, the 3×3 object regions are labeled with the suffix A: 1A-9A. Similarly, the rays from the object 150 that propagate through aperture regions B,C,D (viewpoints B,C,D), would produce corresponding optical images 155B,C,D with 3×3 object regions labeled 1B-9B, 1C-9C and 1D-9D. Each of these four optical images 155A-D is produced by rays travelling through different aperture regions A-D but they are all produced simultaneously by the plenoptic imaging system 110 and they are overlapping at the IP.

The four optical images 155A-D, which are overlapping at the IP, are separated by the microimaging array 114. The images 155A-D are interleaved at the sensor plane, as shown in FIG. 1B. Using image 155A as an example, the 3×3 object regions 1A-9A from optical image 155A are not contiguous in a 3×3 block within optical image 170, which for convenience will be referred to as the plenoptic image. Rather, regions 1A, 1B, 1C and 1D, from the four different optical images, are arranged in a 2×2 fashion in the upper left of plenoptic image 170 (the inversion of image 170 is neglected for clarity). Object regions 2-9 are similarly arranged. Thus, the regions 1A-9A (aka, field positions) that make up optical image 170A are spread out across the plenoptic image 170, separated by portions of the other optical images 170B-D. Put in another way, if the sensor is a rectangular array of individual sensor elements, the overall array can be divided into rectangular subarrays 171(1)-(9) of sensor elements (the dashed outline shows one subarray 171(1)). For each object region 1-9, all of the corresponding regions from each image are imaged onto the subarray. For example, object regions 1A, 1B, 1C and 1D are all imaged onto subarray 171(1). Note that since the aperture 125 and sensor array 180 are located in conjugate planes, each microlens 115 in array 114 forms an image of the pupil plane (same plane as SP') at the sensor plane SP. Since there are multiple microlenses 115, multiple images 171 are formed.

Further note that, in the system shown in FIGS. 1A-1B, the optical images 155A-D are registered with each other. That is, optical image 155A captures the same object region as optical images 155B,C,D. This is because the object is "in focus," meaning that the image plane for the object is coincident with the location of the microimaging array 114. Now consider what happens when the object is "out of focus," as illustrated in FIGS. 2-3.

Figure 2:
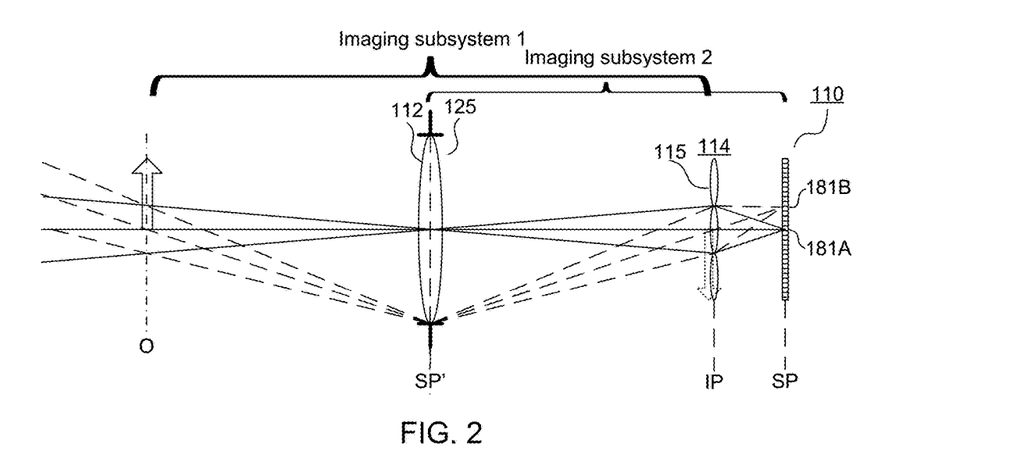
FIGS. 2, 3A and 3B depict diagrams illustrating disparity in a plenoptic imaging system, according to an embodiment.
Figure 3A:
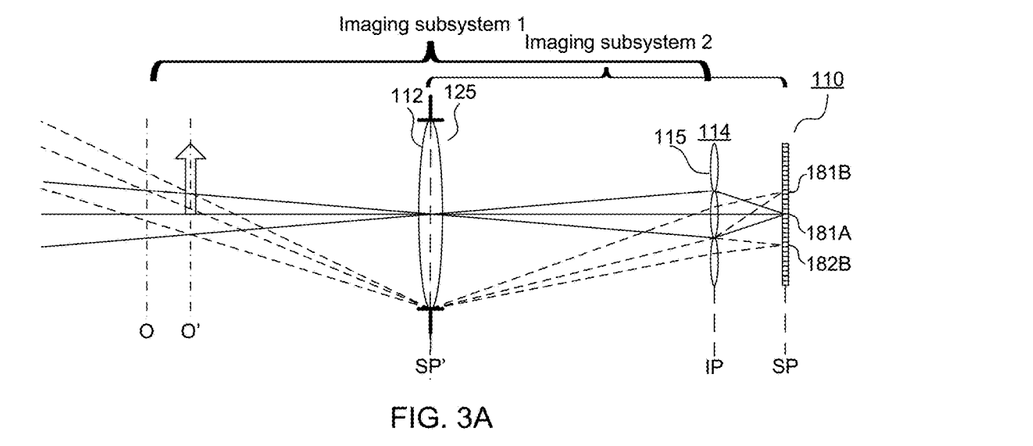
Figure 3B:
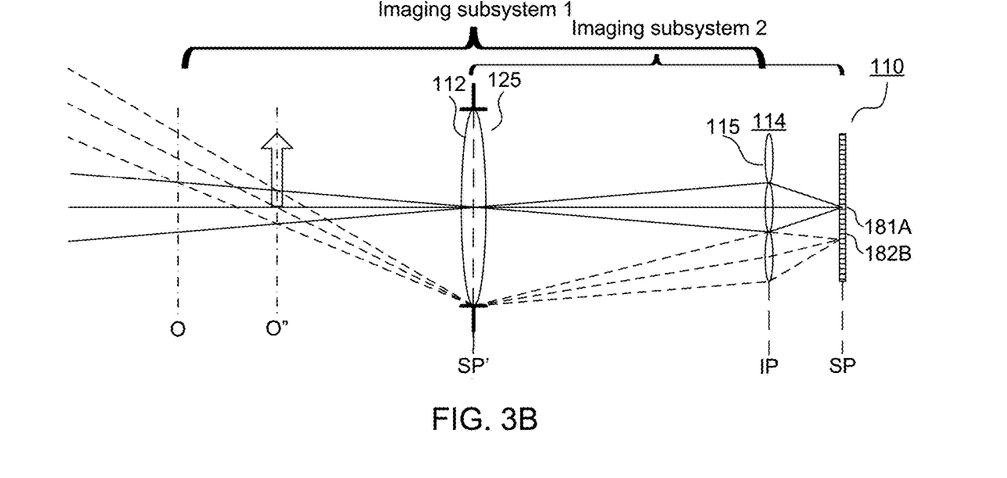

In FIG. 2, consider an object that is located at depth O, which is the "in focus" condition. Now consider a region of the object that is imaged to the center microlens. The solid rays in FIG. 2 show rays from this center region of the object, which also pass through the center of the primary imaging optics 112. This group of rays is imaged by the primary imaging optics 112 onto the center microlens, and then imaged by the center microlens onto sensor element 181A. This group of rays represents the light field from the center region of the in focus object as viewed from center viewpoint A.

The dashed rays in FIG. 2 shows rays from the center region of the object, but which pass through the edge of the primary imaging optics 112. Because the object is in focus, this dashed group of rays is imaged by the primary imaging optics 112 onto the center microlens, and then imaged by the center microlens onto sensor element 181B. This group of rays represents the light field from the center region of the in focus object as viewed from an off-axis viewpoint B.

Note that all of the solid rays are collected by sensor element 181A and all of the dashed rays are collected by sensor element 181B. Sensor element 181A represents the center pixel of the image taken from viewpoint A, and sensor element 181B represents the center pixel of the image taken from viewpoint B. Thus, when the object is in focus, it appears at the same pixel in both the image corresponding to on-axis viewpoint A and the image corresponding to off-axis viewpoint B.

However, this is not the case when the object is out of focus. FIG. 3A shows an object that is located at depth O', which is "out of focus." The in focus plane O is also shown in FIG. 3 for reference. Similar to FIG. 2, FIG. 3A shows rays traced from the center region of this out of focus object. The solid rays (viewpoint A) are not significantly changed. This group of rays is imaged by the primary imaging optics 112 onto the center microlens, and then imaged by the center microlens onto sensor element 181A. The out of focus object still appears in the center pixel of the image taken from center viewpoint A.

However, the dashed rays in FIG. 3A behave significantly differently. As in FIG. 2, the dashed rays are rays from the center region of the object, and which pass through the edge of the primary imaging optics 112. These dashed rays can be split into two groups. One group of rays is imaged by the primary imaging optics 112 onto the center microlens, and then imaged by the center microlens onto sensor element 181B. However, because the object is out of focus, some of the dashed rays are imaged by the primary imaging optics 112 not onto the center microlens but onto the adjacent microlens. This microlens images these rays onto sensor element 182B, which is the sensor point corresponding to viewpoint B but for the pixel adjacent to the center pixel. Thus, the dashed rays from the center region of the out of focus object will be partially collected by sensor element 181B and partially collected by sensor element 182B. Sensor elements 181B and 182B are adjacent pixels in the image for viewpoint B. Thus, this center object region will be located somewhere between pixels 181B and 182B in viewpoint B. This is shifted relative to viewpoint A, where the center object region is located entirely at center pixel 181A. This relative shift is referred to as disparity.

In FIG. 3A, this disparity is sub-pixel, but the disparity can also be more than a pixel or even multiple pixels. For example, FIG. 3B illustrates a situation in which the disparity is a full pixel for an object located at depth O". In this case, the solid rays are still imaged onto the center sensor element 181A. However, all of the dashed rays are imaged onto sensor element 182B. Therefore, in the image for viewpoint A, the center object region is located at the center pixel corresponding to sensor element 181A. However, in the image for viewpoint B, the center object region is located not at the center pixel corresponding to sensor element 181B but at the adjacent pixel corresponding to sensor element 182B. So there is a one pixel shift between viewpoints A and B.

As illustrated in FIGS. 2-3, the relative shift depends on the depth location of the object. Thus, there is a mapping between depth and disparity. Objects at a certain depth will produce a certain disparity between the multiple images captured in the plenoptic image. Conversely, if the multiple images in the plenoptic image exhibit a certain disparity, this means the object is located at the corresponding depth. Furthermore, if the object is three-dimensional, then the object depth will vary as a function of field position. Some points on the object will be closer to the plenoptic imaging system and some farther away. In addition, due to aberrations or other characteristics of the plenoptic imaging system, the depth-disparity mapping may also vary as a function of field position. A disparity at the center of the field of view may map to a certain depth, but the same disparity at the edge of the field of view may map to a different depth.

Figure 4:
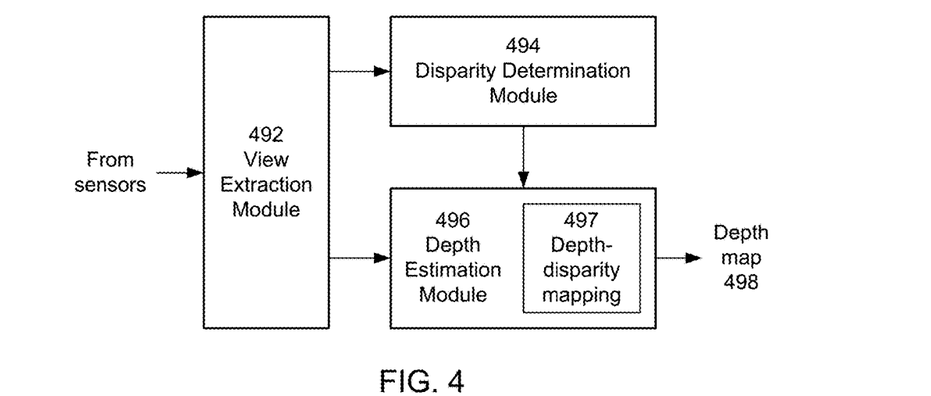
FIG. 4 shows a block diagram of a processing module, according to an embodiment.

FIG. 4 shows a block diagram of one implementation of processing module 190 that estimates depth. In this example, the multiplexed and interleaved images 155 are received by a view extraction module 492, which separates the sensor data into separate images 155 (or views). As described above, images of the same point in the object space are shifted relative to each other in these views. That is, they exhibit disparity that depends of the depth of that point. The disparity from one view to the next can be less than one pixel (sub-pixel disparity) or more than one pixel. Disparity determination module 494 calculates the disparity for a set of positions in the field, referred to as a disparity map. For example, it may do this by comparing different views 155. Alternately, disparity determination module 494 may obtain the disparity from other sources, for example user input. Depth estimation module 496 then estimates the depth across the object by mapping the disparity from disparity determination module 494 to corresponding depth. It uses a depth-disparity mapping 497 to do this. The mapping 497 between depth and disparity is the result of a calibration process, described in further detail below. The output is a depth map 498 that estimates the depth to different points on the object. In one embodiment, the output image is made of pixels, with conventional image data (e.g., RGB data) for each pixel but also including depth information for each pixel.

Figure 5:
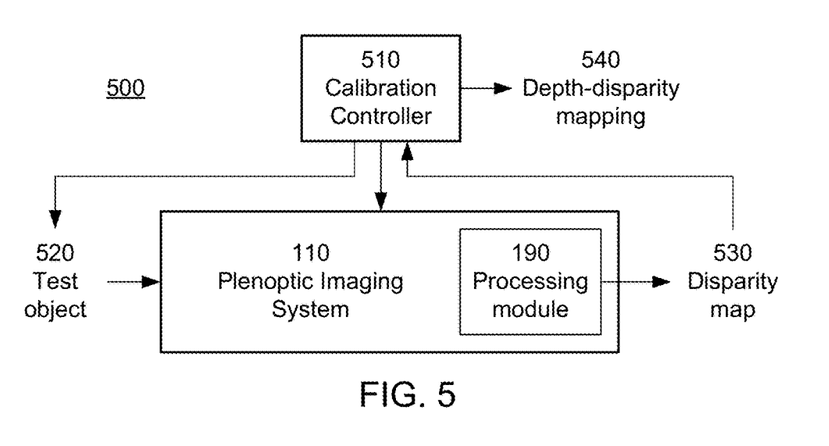
FIG. 5 shows a block diagram of a calibration system for depth-disparity mapping, according to an embodiment.
Figure 6:
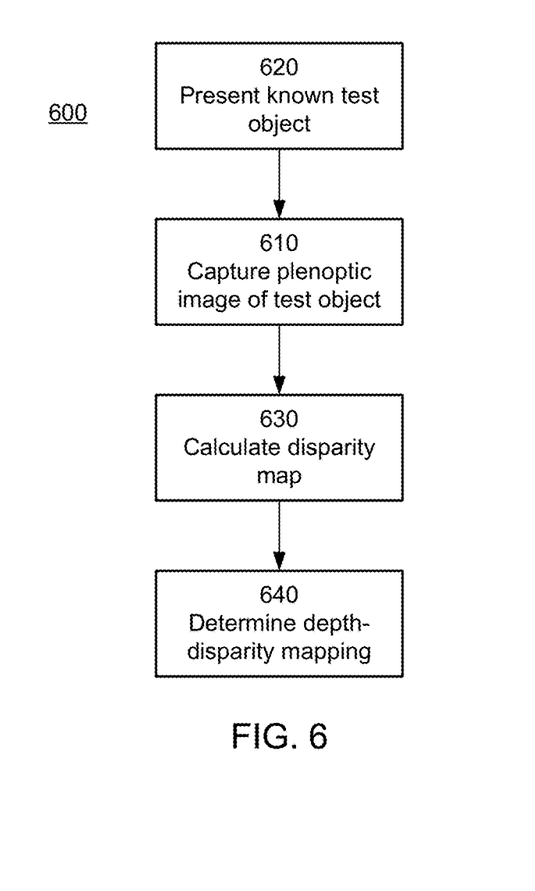
FIG. 6 depicts a flow diagram illustrating a method for calibrating a depth-disparity mapping for a plenoptic imaging system, according to an embodiment.

FIG. 5 shows a block diagram of a calibration system 500 for depth-disparity mapping, according to an embodiment. FIG. 6 depicts a flow diagram illustrating a method 600 for calibrating a depth-disparity mapping for a plenoptic imaging system. In FIG. 5, box 110 represents the plenoptic imaging system to be calibrated. Only the processing module 190 is explicitly shown. In FIG. 5, the method 600 is implemented by the calibration controller 510.

The controller 510 controls the presentation of test objects 520. It presents 620 one or more test objects to the plenoptic imaging system. Consider one test object at a time. The test object 520 is at a known depth and known field position. The plenoptic imaging system 110 captures 610 a plenoptic image of the test object. As described above, the image captured by the plenoptic imaging system is processed to create multiple images of the object taken from different viewpoints. The processing module 190 calculates 630 a disparity map 530 for the test object based on the different viewpoint images. In the example of FIG. 5, this is done by the processing module 190 within the plenoptic imaging system. For example, it may be the output of disparity determination module 494 in FIG. 4. However, this calculation can also be done outside the plenoptic imaging system. The plenoptic image data may be output by the imaging system and then processed to obtain the disparity map 530. The controller 510 knows the depths and field positions for the test object 520 and obtains the corresponding disparities 530. Based on this data, it then determines 640 a mapping 540 between depth and disparity as a function of field position.

The depth-disparity mapping may be represented in different forms. It may be stored as a lookup table, possibly using interpolation to estimate values that are not expressly stored in the lookup table. Alternately, the mapping may be represented as a functional mapping, such as a polynomial fit where the coefficients of the polynomial are stored. The processing module of FIG. 4 can then use the depth-disparity mapping to estimate depth for real objects captured by the plenoptic imaging system 110.

FIGS. 7-13 illustrate one approach for developing the depth-disparity mapping through calibration. As shown in FIGS. 7A-7D, two-dimensional slices I(x,u) of the four-dimensional light field exhibit a line structure that is inherent to the characteristics of light fields with uniformly spaced viewpoints, where the angle of the line in the (x,u) domain corresponds to different depths in the object. FIG. 7A shows two objects 710 and 720 which are at different depths. Object 720 is forward of object 710. It may or may not occlude object 710, depending on the viewpoint u.

Figure 7A:
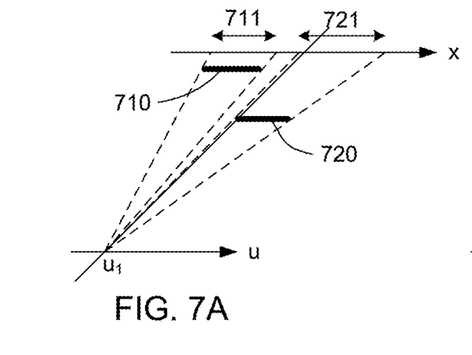
FIGS. 7A-7C show diagrams illustrating two objects viewed from three different viewpoints.

FIG. 7A is taken from viewpoint $u_1$. From this viewpoint, object 710 occupies the x interval 711 and object 720 occupies the x interval 721. The two intervals 711 and 721 do not overlap and there is no occlusion. FIG. 7D shows a two-dimensional (x,u) slice of the light field for these two objects. The x-slice of FIG. 7A is marked by $u_1$ on the vertical u axis. The two intervals 711 and 721 are reproduced as the two line segments at coordinate $u=u_1$ in FIG. 7D.

Figure 7B:
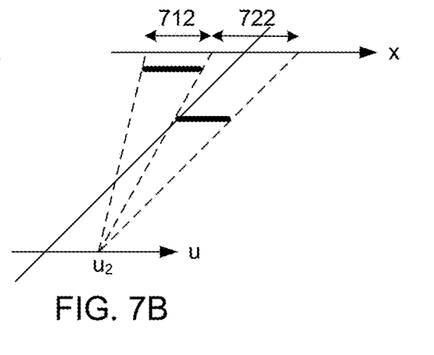

FIG. 7B shows the same two objects from a different viewpoint $u_2$. From this viewpoint, object 710 occupies the x interval 712 and object 720 occupies the x interval 722. This is also shown by the two line segments at coordinate $u=u_2$ in FIG. 7D. Note that there is a shift of these segments with respect to the segments at coordinate $u=u_1$. This relative shift is due to parallax caused by the change in viewpoint. In FIG. 7B, the two x intervals 712 and 722 are just touching.

Figure 7C:
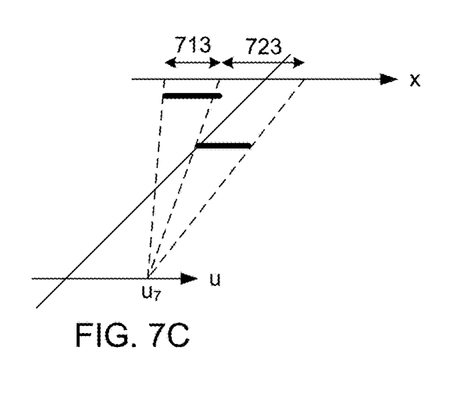
Figure 7D:
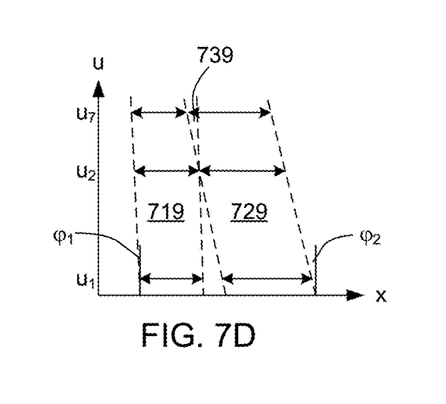
FIG. 7D shows a diagram illustrating an (x,u) slice of the corresponding light field.

FIG. 7C shows the two objects from viewpoint $u_3$. Here, object 710 occupies the x interval 713 and object 720 occupies the x interval 723, as also shown by the two line segments at $u=u_3$ in FIG. 7D. The two x intervals 713 and 723 are overlapping, which means that object 720 occludes part of object 710. The occluded region is the area of overlap. Repeating this process for other viewpoints u results in the two trapezoids 719 and 729 shown in FIG. 7D, which will be referred to as ray regions. The area of overlap 739 represents the occlusion of object 710 by object 720. Since object 720 is forward of object 710, ray region 729 will be unaffected by the overlap region 739. That is, the edges of ray region 729 will continue to be parallel. In contrast, ray region 719 will be minus the triangular overlap region 739.

FIG. 7D shows an inherent line structure. Each point in an object creates a line in the (x,u) plane at an angle φ with respect to the normal to the x axis. A set of adjacent points at the same depth creates a ray region of a certain width, which forms an angle φ with the vertical axis. These angles are labeled $\varphi_1$ and $\varphi_2$ in FIG. 7D. In the general four-dimensional case, these angles would be with respect to the normal to the (x,y) plane. For convenience, the angle φ will be referred to as the disparity angle. The disparity angle φ depends on the depth location of the object. Due to parallax, objects that are farther in depth from the viewpoint u-plane produce lines with a smaller disparity angle φ. Ray region 719, which corresponds to object 713 which is farther from the u axis has a lower disparity angle φ. Ray region 729, which corresponds to object 723 which is closer to the u axis, has a larger disparity angle φ. In some configurations of camera arrays or plenoptic cameras, the angle φ can also be negative. These ray regions correspond to objects that are located further behind the focal plane of the main lens, i.e., behind objects that produce vertical ray regions (i.e., ray regions with φ=0). Generally, the angle $\varphi_2$ can take values within the interval $(-\pi/2, \pi/2)$.

Figure 8:
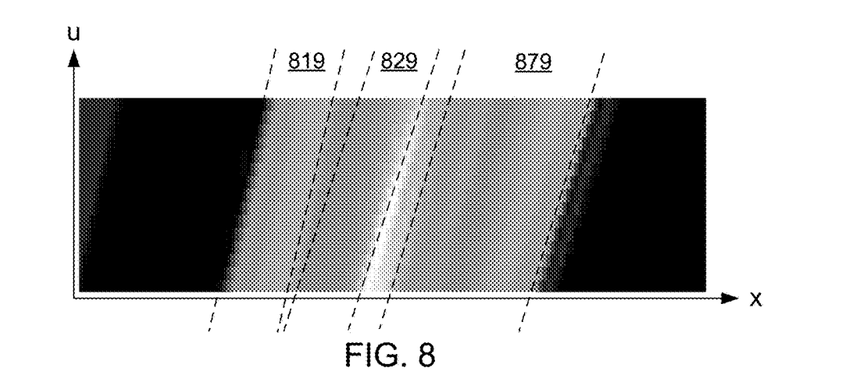
FIG. 8 shows ray regions superimposed on an (x,u) slice from a light field for a grayscale scene.

FIG. 8 shows an (x,u) slice from a light field for a grayscale scene. FIG. 8 also shows three ray regions 819, 829 and 839, of varying disparity angle and width. There is a direct correspondence between the disparity angle φ and the disparity Δ between two selected viewpoints, given by:

$$\Delta = b \tan \varphi \quad (1)$$

where b denotes the baseline between the selected viewpoints. For uniformly spaced viewpoints, one measure of the baseline b is the number of views between the two selected viewpoints. For example, if the selected viewpoints are the $1^{st}$ and the $N^{th}$ viewpoint, then b=N−1. Therefore, the disparity angle φ is a measure of disparity and the term "disparity" is intended to include the disparity angle φ and other measures of disparity as described above, in addition to the quantity Δ.

The disparity angle φ can be estimated based on the method described in U.S. application Ser. No. 14/064,090, "Processing of Light Fields by Transforming to Scale and Depth Space," which is incorporated by reference herein. In one approach, the light field I(x,u) is transformed to $\mathcal{L}$ (x; σ,φ), where σ is a scale dimension and φ is a depth or disparity dimension. For convenience, $\mathcal{L}$ (x;σ,φ) may be referred to a scale-depth transform of I(x,u). The following explanation is presented in two dimensions (x,u) rather than four (x,y,u,v) for clarity of explanation. The scale-depth transform $\mathcal{L}$ (x;σ,φ) is defined as $$\mathcal{L}(x;\sigma,\varphi) = (I * \mathcal{R}_{\sigma,\varphi})(x,u)|_{u=0} \quad (2A)$$

where u=0 is chosen because we are evaluating convolution only over x (image domain). That is, $$(f*g)(x,u)|_{u=0} = \int_x \int_u f(x-x',-u')g(x',u')dx'du' \quad (2B)$$

Note here that $\mathcal{L}$ (x; σ, φ) does not depend on u since the convolution is only over x, and that $\mathcal{L}$ (x; σ, φ) has both scale σ and angle φ as parameters. The kernel for the transformation is referred to as a Ray-Gaussian kernel and is given by $$\mathcal{R}_{\sigma,\varphi}(x, u) = \frac{1}{\sigma\sqrt{2\pi}} e^{-\frac{(x+u\tan\varphi)^2}{2\sigma^2}}, \quad (2C)$$

Similarly, we define the n-th derivative of the Ray-Gaussian transform as:

$$\frac{d^n}{dx^n}\mathcal{L}(s; \sigma, \varphi) = \left(I * \frac{d^n}{dx^n}\mathcal{R}_{\sigma,\varphi}\right)(x, u)|_{u=0} \quad (3)$$

We can then find ray regions by finding extrema (local minima and maxima) of the normalized second derivative Ray Gaussian transform $\mathcal{L}\ ''(x;\sigma;\varphi) = (I * \mathcal{R}\ ''_{\sigma,\varphi})(x,u)|_{u=0}$. The parameters of extrema points $\{(x_p, \sigma_p, \varphi_p)\}$ give the following information about each ray region p:

position of the center of the ray region $x_p$
width of the ray region $2\sigma_p$
angle of the ray region $\varphi_p$ Other methods in the literature can also be used to estimate the disparity angle $\varphi$. The disparity angle $\varphi$ can be estimated from (y,v) slices or slices at other angles, in addition to the (x,u) slice. The estimated value of $\varphi$ can be used to calculate the disparity $\Delta$. Alternately, processing can proceed based on the disparity angle $\varphi$ instead. Another approach is to use conventional methods to directly estimate the disparity $\Delta$ from two or more views, without computing the disparity angle $\varphi$.

There is also a one-to-one mapping between disparity angle $\varphi$ (or disparity $\Delta$) and depth value z. This mapping depends on the plenoptic imaging system configuration and typically also varies as a function of field position (i.e., as a function of (x,y) coordinates). The depth-disparity mapping can be obtained by a calibration process. In one approach, the mapping is fitted into a linear model:

$$\varphi(x,y,z) = a(x,y)z + b(x,y), \quad (4)$$

where a(x,y) and b(x,y) are the mapping coefficients in units of radians/mm and radians, respectively.

Figure 9:
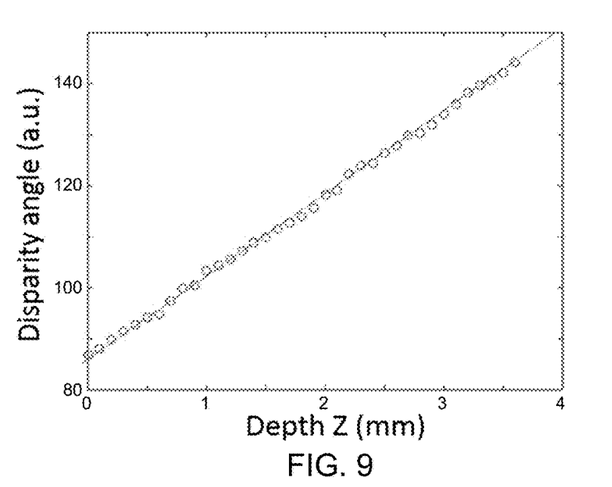
FIG. 9 illustrates a plot of disparity angle as a function of depth, according to an embodiment.

FIG. 9 illustrates a plot of disparity angle as a function of depth for an example plenoptic imaging system. The linear fit of Eqn. 4 is a good approximation typically for a given depth range around focus. In a more general scenario, coefficients a and b may vary as a function of depth z. In one approach, the coefficient a is approximately constant throughout the field, while the coefficient b varies from the center to the edge due to the field curvature. The amount of variation depends on the optics in use. For example, in FIG. 12D, the coefficient b varies from −0.2 mm at the center to −0.6 mm at the edge.

Figure 10:
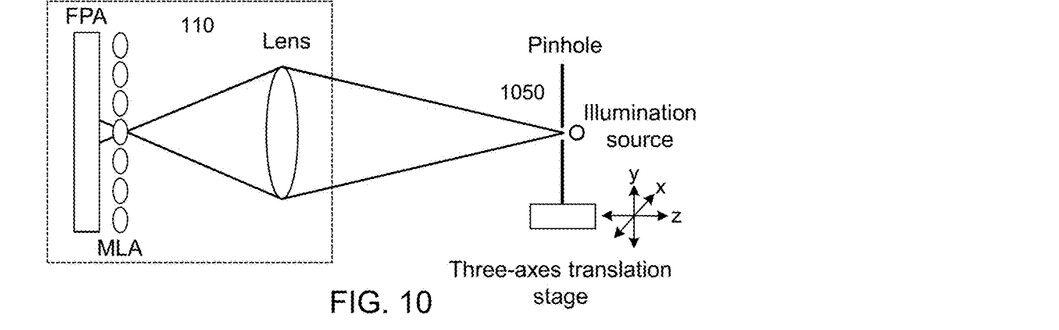
FIG. 10 depicts a diagram of a calibration system, according to an embodiment.

FIG. 10 depicts a diagram of a calibration system, according to an embodiment. The plenoptic imaging system 110 is represented by a lens, a microlens array (MLA) and a focal plane array (FPA). The test object is a point object 1050, which in this example is implemented as a pinhole used to spatially filter a light source. The illuminated pinhole is imaged by the plenoptic imaging system 110. To construct the lookup tables between disparity and depth, the pinhole 1050 is scanned along three axes—laterally to different field positions across the imaging field of view (FOV) and axially to different depths across the depth of focus. Scanning the point object 1050 effectively samples the depth-disparity mapping over a range of depths and field positions. In one approach, the samples are uniformly spaced in depth and in field position, and the point object 1050 is scanned over the entire field of view and over the entire depth of field (e.g., as defined by a pinhole aperture). The point object 1050 can be scanned using different scanning patterns, and it could be scanned over other ranges of depth and field position. In another approach, the optical system is assumed to be axially symmetric and the pinhole 1050 is scanned along only two axes: one lateral and one axial. Scanning patterns can also take advantage of other types of symmetry.

The captured plenoptic images are processed as described above to determine the disparity corresponding to each position of the test object 1050. In this way, each scan point produces a pairing of depth and disparity for a given field position. This data is fit to the linear model given by Eqn. 4, producing estimates for the coefficients a and b as a function of field position.

Figure 11A:
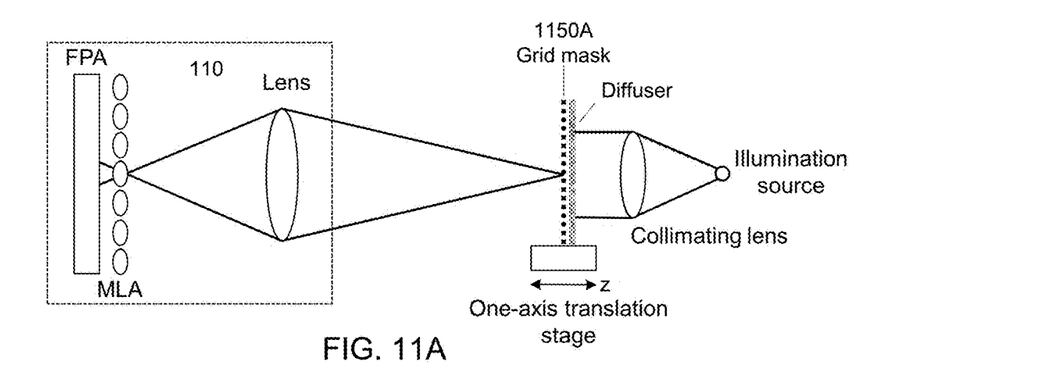
FIGS. 11A-11B depict diagrams of additional calibration systems, according to an embodiment.
Figure 11B:
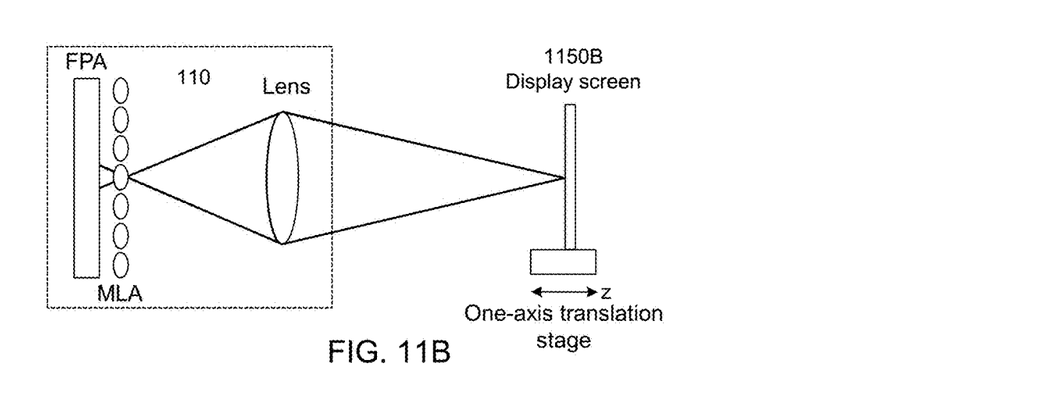

FIGS. 11A-11B depict diagrams of additional calibration systems, according to an embodiment. These examples use a planar test object 1150 that is moved to different depth locations. In FIG. 11A, the planar object 1150A is a physical grid mask used to filter a light source. The illumination light is first collimated by a lens and then shined onto a diffuser. The gridded object is illuminated by the diffused light and imaged by the plenoptic imaging system 110. Rather than scanning along all three axes as in the pinhole-scanning-based approach, the grid mask here scans along only the z axis, thereby speeding up the calibration by a factor of $N_x \times N_y$ ($N_x$, $N_y$, the number of scanning positions along the x,y axes).

In FIG. 11B, an electronic display screen 1150B, such as a liquid-crystal display (LCD), is used as the test object. A grid pattern, such as a grid of point objects, is displayed on the screen and imaged by the plenoptic imaging system 110. To sample the disparity-to-depth mapping, scanning is performed along only the z axis. Compared with the implementation that uses a physical grid mask, the display-based approach does not require external illumination, thereby resulting in a simplified experimental setup.

As an experiment, we calibrated a light field camera with an input numerical aperture of 0.03 (object side) using both the pinhole-scanning-based and grid-scanning-based approaches, respectively. In the pinhole-scanning-based calibration, we scanned a pinhole-filtered light source across 100×30 points on the x-z plane with a step size of 0.1 mm. In the grid-scanning-based calibration, we scanned a grid target (period, 0.4 mm) along the z axis with 0.1 mm step size and acquired a total of 30 images.

Figure 12A:
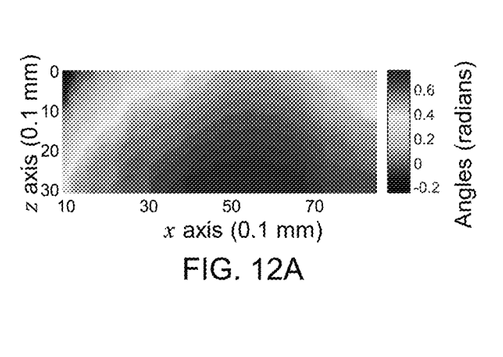
FIGS. 12A-12D illustrate experiments to calculate a depth-disparity mapping as a function of field position, according to various embodiments.
Figure 12B:
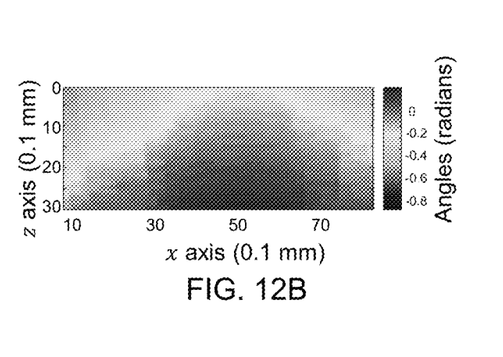

FIG. 12A shows the calculated depth-disparity mapping as a function of field position x using the pinhole-scanning-based calibration, and FIG. 12B shows the calculated depth-disparity mapping using the grid-scanning-based calibration. Notably, the curved contour of disparity angles is due to the field curvature aberration.

Figure 12C:
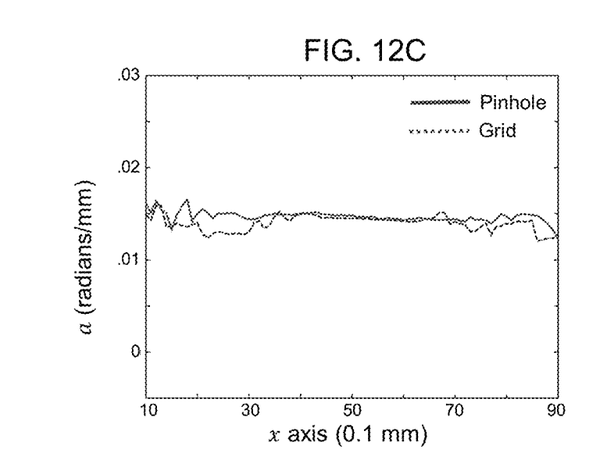
Figure 12D:
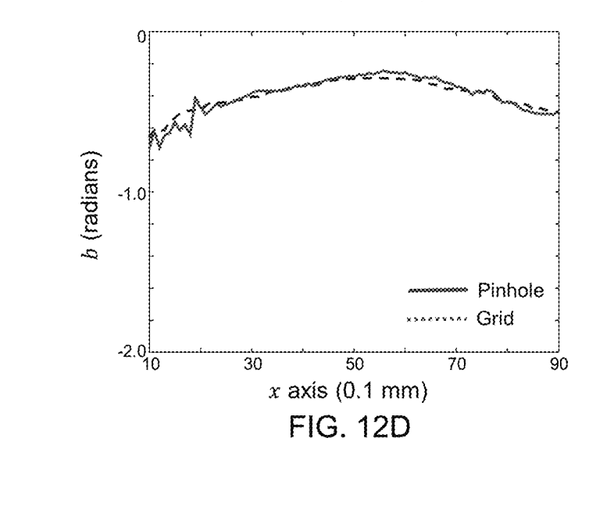

FIGS. 12C and 12D show the coefficients a(x) and b(x) obtained by fitting the data from FIGS. 12A and 12B, to the linear model of Eqn. 4. The results show that the coefficients a(x) and b(x) calculated by both methods are closely matched across the 3 mm range of depth z and across the 8 mm range of field position x. In this example, we have scanned along the x-axis only and assumed circular symmetry to obtain the full x-y plane, but in general the y-axis can also be scanned.

Figure 13:
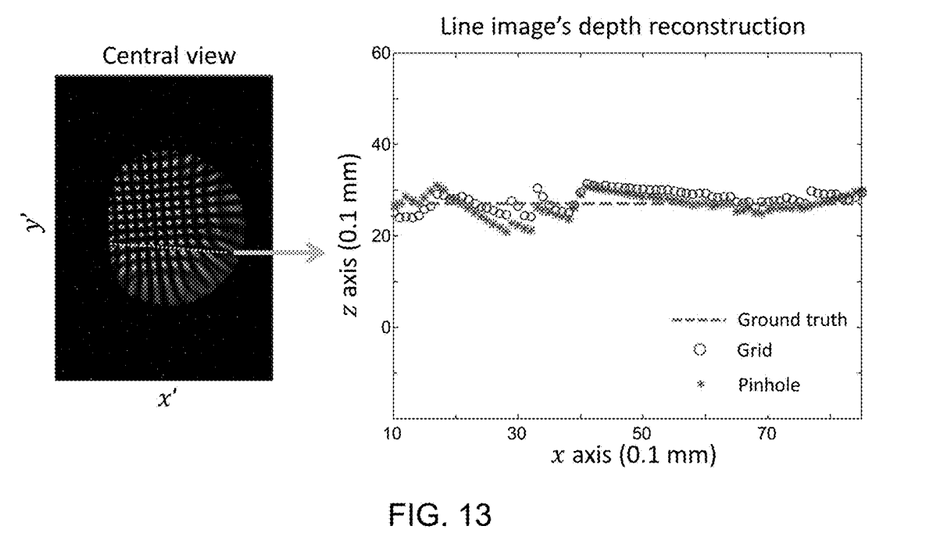
FIG. 13 illustrates an experiment to evaluate the calibrations developed in FIG. 12.

The coefficients obtained above were then used for depth estimation as a test of the calibration procedure. We imaged a planar real object (a grid pattern with a period of 0.8 mm) at a nominal depth of 27 mm. A disparity map was calculated from the acquired plenoptic image. The disparity angle at each field position was converted to depth using the linear coefficients a and b obtained by the pinhole-scanning-based calibration and by the grid-scanning-based calibration. The reconstructed depths across a line image are shown in FIG. 13. The mean values of reconstructed depths calculated by both methods closely match with the ground truth. The depth accuracy, defined as the standard deviation of reconstructed depths, is ~0.3 mm for both methods. x=50 corresponds to the center of the image.

Although the detailed description contains many specifics, these should not be construed as limiting the scope of the invention but merely as illustrating different examples and aspects of the invention. It should be appreciated that the scope of the invention includes other embodiments not discussed in detail above. For example, other combinations will be apparent. In one alternative, pinhole scanning is used to acquire samples of the depth-disparity mapping over a range of depths and field positions, and this acquired data is fit to a linear model of the depth-disparity mapping. In an alternate approach, scanning with a planar test object is used to acquire samples of the depth-disparity mapping, and the mapping is then represented by a lookup table of values. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. In the receiver described above, the modules were implemented as dedicated circuitry (e.g., part of an ASIC), in order to take advantage of lower power consumption and higher speed. In other applications, the modules can be implemented as software, typically running on digital signal processors or even general-purpose processors. Various combinations can also be used. Furthermore, different modules can share common components or even be implemented by the same components. There may or may not be a clear boundary between different modules.

What is claimed is:

1. A method for calibrating a depth-disparity mapping for a plenoptic imaging system, the method comprising:
presenting one or more test objects to the plenoptic imaging system;
receiving known field positions and known depths for the test objects;
the plenoptic imaging system capturing plenoptic images of the test objects, the plenoptic images comprising multiple images of the test objects captured from different viewpoints;
calculating disparities for the test objects based on the multiple images taken from different viewpoints; and
determining a mapping between depth and disparity as a function of field position, based on the calculated disparities and the corresponding received known depths for the test objects for different known field positions of the test objects.

2. The method of claim 1 wherein:
the test objects comprise a point object;
presenting test objects to the plenoptic imaging system comprises moving the point object to different depths and field positions spanning a range of depths and a range of field positions; and
capturing plenoptic images of the test objects comprises capturing plenoptic images of the point object over the range of depths and over the range of field positions.

3. The method of claim 1 wherein:
the test objects comprise a planar object that spans a range of field positions;
presenting test objects to the plenoptic imaging system comprises moving the planar object to different depths spanning a range of depths; and
capturing plenoptic images of the test objects comprises capturing plenoptic images of the planar object over the range of depths.

4. The method of claim 3 wherein the planar object is a gridded object.

5. The method of claim 3 wherein the planar object is a grid of point objects.

6. The method of claim 1 wherein presenting test objects to the plenoptic imaging system provides samples of the mapping between depth and disparity over a range of depths and over a range of field positions.

7. The method of claim 6 wherein the samples are uniformly spaced over the range of depths.

8. The method of claim 6 wherein the samples are uniformly spaced over the range of field positions.

9. The method of claim 1 wherein the mapping between depth and disparity is a linear mapping between depth and disparity.

10. The method of claim 1 wherein determining the mapping between depth and disparity as a function of field position comprises determining coefficients for the linear mapping based on the calculated disparities and the corresponding known depths for the test objects for different known field positions of the test objects.

11. The method of claim 1 wherein calculating disparities for the test objects comprises calculating disparities for the test objects based on multiple images of the test objects taken from viewpoints that vary along one dimension.

12. The method of claim 1 wherein the mapping between depth and disparity varies as a function of field position.

13. The method of claim 1 wherein the variation in the mapping between depth and disparity as a function of field position is caused by aberrations in the plenoptic imaging system.

14. The method of claim 1 further comprising:
storing the mapping between depth and disparity as a lookup table.

15. The method of claim 1 further comprising:
storing the mapping between depth and disparity as coefficients for a polynomial fit to the mapping.

16. The method of claim 1 further comprising:
capturing a plenoptic image of a real object, the plenoptic image comprising multiple images of the real object captured from different viewpoints;
calculating disparities for the real object based on the multiple images taken from different viewpoints; and
determining depths at different field positions of the real object, based on the calculated disparities and the mapping between depth and disparity as a function of field position.

17. The method of claim 16 further comprising:
processing the determined depths at different field positions of the real object to obtain a three-dimensional reconstruction of the object.

18. The method of claim 1 wherein calculating disparities for the test objects comprises:
determining disparity angles from the plenoptic images; and
calculating the disparities from the disparity angles.

19. The method of claim 1 where the plenoptic imaging system includes a spectral filter array located in a pupil plane of a primary imaging module of the plenoptic imaging system.

20. A computer program product for calibrating a depth-disparity mapping for a plenoptic imaging system, the computer program product stored on a non-transitory computer readable medium and including program code for performing a method comprising:
causing a calibration system to present one or more test objects to the plenoptic imaging system;
receiving known field positions and known depths for the test objects;
causing the plenoptic imaging system to capture plenoptic images of the test objects, the plenoptic images comprising multiple images of the test objects captured from different viewpoints;
calculating disparities for the test objects based on the different viewpoint images; and
determining a mapping between depth and disparity as a function of field position, based on the calculated disparities and the corresponding received known depths for the test objects for different known field positions of the test objects.

\* \* \* \* \*